R. MACDONALD.
Journal.
No. 208,983.  Patented Oct. 15, 1878.
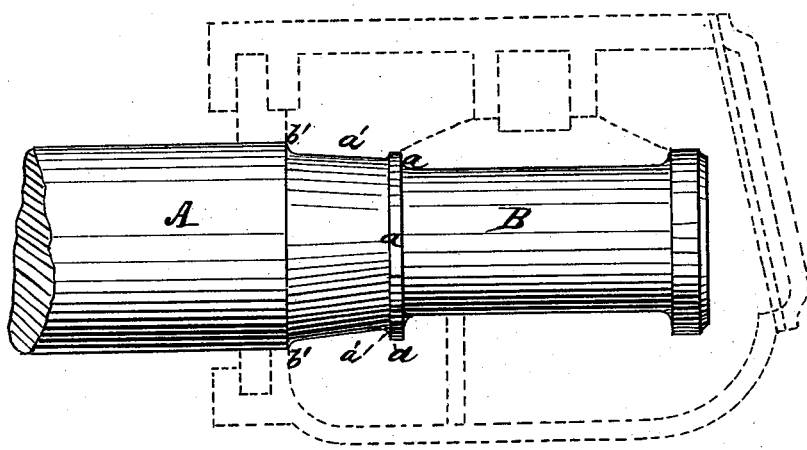
Witnesses:
Henry Eahling
H. Wells Jr
Inventor:
Ranald Macdonald
per James A Whitney
Atty.

UNITED STATES PATENT OFFICE.

RANALD MACDONALD, OF BROOKLYN, NEW YORK.

IMPROVEMENT IN JOURNALS.

Specification forming part of Letters Patent No. 208,983, dated October 15, 1878; application filed January 9, 1878.

*To all whom it may concern:*

Be it known that I, RANALD MACDONALD, of Brooklyn, in the county of Kings and State of New York, have invented an Improvement in Journals, &c., of which the following is a specification:

In journals of axles and the like, as ordinarily constructed and applied in their bearings or journal-boxes, the lubricating-oil is liable to flow from the bearings along the surfaces of the axle or shaft adjacent to the bearing, and thus escape, so that by this means a continuous flow and loss of oil from the bearing is caused.

The present invention is designed to remedy this evil; and it consists in a journaled axle or shaft of peculiar construction, whereby provision is made for throwing off the oil, when it has crept to a certain point, from the end of the journal by centrifugal force, and thus causing it to flow back to the oil-receiver ordinarily placed below the box or bearing, where it may be collected for further use, the peculiar construction, moreover, embraced in said invention preventing any weakening of the axle or shaft, such as would occur from a structure or form substantially different from that set forth herein.

The drawing shows a side view of an apparatus embodying my said invention.

A indicates the end portion of a railway-axle, to which, as well as to other revolving axles or shafts, as the case may be, my said invention is applicable, and B the journal formed upon the end or extremity thereof, and which, as indicated in the drawing, is placed in the usual manner in a suitable box or bearing. At the innermost end of this journal B is a circumferential rib or flange, $a$, from the base $a'$ of which the diameter increases in regular gradation until the tapering portion thus provided is merged by a curve, as shown at $b'$, into the regular cylindric form of the axle or shaft A. Oil or equivalent lubricant being supplied in the usual or in any suitable way to the journal B as fast as it creeps from the bearing in which said journal works is caused by centrifugal force to pass outward radially upon the rib or flange $a$, and, reaching the circumference thereof, is thrown therefrom, it being manifest that, owing to the diminished diameter of the part at $a'$ of the shaft or axle A, the centrifugal force is less at the base $a'$ than at the circumference of the rib or flange. The lubricating material that has once passed to the said circumference cannot pass in a reverse direction, and hence said rib or flange provides a perfect barrier to the flow of the lubricant along the length of the shaft or axle A, the lubricant, as fast as it is thrown off from the rib or flange, falling back into the bottom of the axle-box or into such other receiver as may be provided, so that it may be collected and used over again. The axle-box and bearing is indicated in outline in the drawings.

It is to be observed, further, that from the peculiar tapering form given to the metal between the points $a'$ and $b'$ provision is made for the formation of the rib or flange $a$ without forming a deeply-cut or sharply-figured groove in the axle, and the fullest strength is maintained in the latter by the avoidance of sharp corners, from which fractures would be likely to start.

What I claim as my invention is—

In a journaled shaft or axle, the combination of the rib or flange $a$ with the gradually-tapering portion $a'$ $b'$, the said tapering portion enlarging from the base of the rib or flange $a$ to its junction with the cylindric surface of the shaft or axle, all substantially as and for the purpose herein set forth.

RANALD MACDONALD.

Witnesses:
H. WELLS, Jr.,
EDWARD HOLLY.